(12) United States Patent
Preuß et al.

(10) Patent No.: US 10,940,749 B2
(45) Date of Patent: Mar. 9, 2021

(54) GEARBOX OF A MOTOR VEHICLE AND METHOD FOR OPERATING A MOTOR VEHICLE

(71) Applicant: ZF Friedrichshafen AG, Friedrichshafen (DE)

(72) Inventors: Michael Preuß, Friedrichshafen (DE); Johannes Kaltenbach, Friedrichshafen (DE); Christian Mittelberger, Ravensburg (DE); Johannes Glückler, Eriskrich (DE); Stefan Renner, Bodman-Ludwigshafen (DE); Rayk Gersten, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 337 days.

(21) Appl. No.: 16/064,113

(22) PCT Filed: Nov. 22, 2016

(86) PCT No.: PCT/EP2016/078432
§ 371 (c)(1),
(2) Date: Jun. 20, 2018

(87) PCT Pub. No.: WO2017/108303
PCT Pub. Date: Jun. 29, 2017

(65) Prior Publication Data
US 2019/0077246 A1    Mar. 14, 2019

(30) Foreign Application Priority Data
Dec. 21, 2015 (DE) .............. 10 2015 226 251.0

(51) Int. Cl.
*B60K 6/48* (2007.10)
*B60K 6/365* (2007.10)
(Continued)

(52) U.S. Cl.
CPC ............... *B60K 6/48* (2013.01); *B60K 6/365* (2013.01); *B60K 6/547* (2013.01); *B60W 10/06* (2013.01);
(Continued)

(58) Field of Classification Search
CPC ............ B60W 10/196; B60W 10/113; B60W 10/184; B60W 30/18109; B60W 20/10;
(Continued)

(56) References Cited

U.S. PATENT DOCUMENTS 6,319,168 B1 * 11/2001 Morris ................... B60K 6/44
                                                       477/5
7,967,723 B2 * 6/2011 Ebner ................... B60W 30/19
                                                       477/93

(Continued)

FOREIGN PATENT DOCUMENTS

DE    10 2007 042 949 A1    4/2009
DE    10 2008 043 732 A1    6/2009
(Continued)

OTHER PUBLICATIONS

German Search Report Corresponding to 10 2015 226 251.0 dated Dec. 2, 2016.

(Continued)

*Primary Examiner* — Steve Clemmons
(74) *Attorney, Agent, or Firm* — Davis & Bujold PLLC; Michael J. Bujold

(57) ABSTRACT

A method of operating a vehicle having a hybrid drive, a transmission with shift elements, a drive output with a brake, a main transmission with input shafts, an output shaft and planetary gear sets (PG1, PG2). The main transmission has five gear planes. One shift element can connect a gear plane to an element of gear set (PG1) adjoining the main transmission. Another shift element couples a further element of
(Continued)

gear set (PG1) either to the output shaft or a housing. An electric machine is permanently connected to an element of gear set (PG2). If, while driving with a transmission gear engaged, the drive output brake is engaged for a full brake application, a shift element of the transmission is first relieved by the electric machine and/or a brake assigned to one of the input shafts and then subsequently disengaged to decouple the combustion engine from the drive output.

15 Claims, 7 Drawing Sheets

(51) Int. Cl.
| | | |
|---|---|---|
| B60K 6/547 | (2007.10) | |
| B60W 10/06 | (2006.01) | |
| B60W 10/08 | (2006.01) | |
| B60W 10/113 | (2012.01) | |
| B60W 10/196 | (2012.01) | |
| B60W 20/40 | (2016.01) | |
| F16H 3/00 | (2006.01) | |
| B60K 6/38 | (2007.10) | |
| F16H 37/04 | (2006.01) | |
| F16H 61/04 | (2006.01) | |

(52) U.S. Cl.
CPC .......... *B60W 10/08* (2013.01); *B60W 10/113* (2013.01); *B60W 10/196* (2013.01); *B60W 20/40* (2013.01); *B60K 2006/381* (2013.01); *B60K 2006/4816* (2013.01); *F16H 3/006* (2013.01); *F16H 37/046* (2013.01); *F16H 2061/0422* (2013.01); *Y02T 10/62* (2013.01)

(58) Field of Classification Search
CPC ......... B60W 20/40; B60K 6/547; B60K 6/48; B60K 6/635; B60K 6/54; B60K 2006/4816; B60K 2006/4825; B60K 2006/381; F16H 2061/0422; F16H 2061/0411; F16H 2061/0414
See application file for complete search history.

(56) References Cited

U.S. PATENT DOCUMENTS

| | | | | |
|---|---|---|---|---|
| 7,992,458 | B2* | 8/2011 | Krieger | F16H 61/0403 74/336 R |
| 8,663,065 | B2* | 3/2014 | Kaltenbach | B60K 6/48 477/15 |
| 8,684,875 | B2* | 4/2014 | Kaltenbach | B60W 10/113 475/5 |
| 8,911,315 | B2* | 12/2014 | Kaltenbach | B60K 6/387 475/5 |
| 8,961,345 | B2* | 2/2015 | Kaltenbach | F16H 37/046 475/5 |
| 9,180,872 | B2* | 11/2015 | Lee | F16H 3/725 |
| 9,283,956 | B2* | 3/2016 | Matsui | F02N 11/0822 11/822 |
| 9,403,428 | B2* | 8/2016 | Glueckler | F16H 3/095 |
| 9,457,799 | B2* | 10/2016 | Kaltenbach | B60W 20/00 |
| 9,541,180 | B2* | 1/2017 | Kaltenbach | F16H 37/065 |
| 9,546,721 | B2* | 1/2017 | Mittelberger | F16H 37/042 |
| 9,597,952 | B2 | 3/2017 | Kaltenbach et al. | |
| 10,071,622 | B2* | 9/2018 | Kaltenbach | B60K 6/365 |
| 10,640,120 | B2* | 5/2020 | Kaltenbach | F16H 37/046 |
| 2008/0113847 | A1* | 5/2008 | Groner | B60W 10/02 477/34 |
| 2009/0239704 | A1* | 9/2009 | Steinborn | B60W 30/19 477/4 |
| 2011/0111910 | A1* | 5/2011 | Ideshio | B60W 10/113 475/5 |
| 2012/0216639 | A1* | 8/2012 | Renner | F16H 63/20 74/331 |
| 2012/0240723 | A1* | 9/2012 | Gluckler | B60W 30/18127 74/661 |
| 2013/0023375 | A1* | 1/2013 | Renner | F16H 37/046 475/209 |
| 2013/0096761 | A1* | 4/2013 | Kuroda | F02D 41/0087 701/22 |
| 2013/0337961 | A1* | 12/2013 | Kaltenbach | B60K 6/48 475/207 |
| 2014/0011624 | A1* | 1/2014 | Reisch | F16H 37/022 475/214 |
| 2014/0038762 | A1* | 2/2014 | Wechs | F16H 37/046 475/218 |
| 2014/0150604 | A1 | 6/2014 | Kaltenbach | |
| 2015/0184731 | A1* | 7/2015 | Lee | B60K 6/547 475/5 |
| 2015/0226324 | A1* | 8/2015 | Gluckler | F16H 3/006 74/664 |
| 2015/0267778 | A1* | 9/2015 | Peterson | F16H 3/08 74/329 |
| 2015/0375736 | A1* | 12/2015 | Kaltenbach | B60K 6/387 477/5 |
| 2017/0122419 | A1* | 5/2017 | Kaltenbach | F16H 3/0915 |

FOREIGN PATENT DOCUMENTS

| | | |
|---|---|---|
| DE | 10 2010 030 573 A1 | 12/2011 |
| DE | 10 2010 063 582 A1 | 6/2012 |
| DE | 10 2011 080 069 A1 | 1/2013 |
| DE | 10 2011 085 199 A1 | 5/2013 |
| DE | 10 2011 089 467 A1 | 6/2013 |
| DE | 10 2012 218 367 A1 | 4/2014 |
| DE | 10 2013 222 510 A1 | 5/2015 |
| EP | 2 631 133 A1 | 8/2013 |
| WO | 2009/024162 A1 | 2/2009 |

OTHER PUBLICATIONS

International Search Report Corresponding to PCT/EP2016/078432 dated May 16, 2017.
Written Opinion Corresponding to PCT/EP2016/078432 dated May 16, 2017.

\* cited by examiner

| | S1 | | S2 | | S3 | | S4 | | S5 | | S6 | | i | phi |
|---|---|---|---|---|---|---|---|---|---|---|---|---|---|---|
| | A | B | C | D | E | F | G | H | L | S | I | J | | |
| G1 | x | | | | | | | | | | | x | 10.604 | 1.300 |
| G2(1) | | x | x | | | | | | | | | x | 8.157 | 1.000 |
| G2(4) | | x | | x | | | x | | x | | | x | 8.157 | 1.300 |
| G3(4) | | x | | x | x | | x | | x | | | x | 6.274 | 1.299 |
| G4 | | x | x | | | | x | | x | | | x | 4.829 | 1.300 |
| G5(4) | x | | | | | x | x | | x | | | x | 3.713 | 1.000 |
| G5(9) | x | | | | | x | | | x | | | x | 3.713 | 1.000 |
| G5(6) | x | | | | | x | | | | | | x | 3.713 | 1.300 |
| G6 | | x | x | | | | | x | | x | | x | 2.856 | 1.300 |
| G7(6) | | x | | x | x | | | x | | x | | x | 2.197 | 1.000 |
| G7(9) | | x | | x | | | | x | | x | | x | 2.197 | 1.000 |
| G8(9) | | x | x | | | | | x | | x | | x | 1.689 | 1.299 |
| G9 | | x | x | | | x | | x | | x | | x | 1.301 | 1.301 |
| G10(9) | | | x | | | x | | | | x | | x | 1.000 | 1.000 |
| G10 | x | | x | | | x | | | | | | x | 1.000 | 1.000 |
| G10(6) | x | | | | | x | | | | x | | x | 1.000 | 1.000 |
| G10(0) | x | | | | | x | | | | x | | x | 1.000 | 1.000 |

| | S1 | | | S2 | S3 | | S4 | | S5 | | S6 | | | |
|---|---|---|---|---|---|---|---|---|---|---|---|---|---|---|
| | A | B | C | D | E | F | G | H | L | S | I | J | i | phi |
| G1 | x | | | | | | | | | | | x | 10.604 | 1.300 |
| G2(1) | x | x | | | | | | | | | | x | 8.157 | 1.000 |
| G2(4) | | x | | x | | | | | | | | x | 8.157 | 1.300 |
| G3(4) | | x | x | | x | | | | | | | x | 6.274 | 1.299 |
| G4 | | x | | x | | | | | | | | x | 4.829 | 1.300 |
| G5(4) | | | | | | x | x | | | | | x | 3.713 | 1.000 |
| G5(9) | | | | | | x | x | x | | | | x | 3.713 | 1.000 |
| G5(6) | x | | | | | x | x | x | | | | x | 3.713 | 1.300 |
| G6 | x | | x | | | | x | x | x | | | x | 2.856 | 1.300 |
| G7(6) | x | | | | | | x | x | x | x | | x | 2.197 | 1.000 |
| G7(9) | | x | | x | | | x | x | x | x | | x | 2.197 | 1.300 |
| G8(9) | | x | | x | | | x | x | x | x | | x | 1.689 | 1.299 |
| G9 | | | x | | x | x | | | x | x | | x | 1.301 | 1.301 |
| G10(9) | | | x | | | x | | | x | x | | x | 1.000 | 1.000 |
| G10 | | x | x | | | x | | | x | x | | x | 1.000 | 1.000 |
| G10(6) | x | | | | | x | | | x | x | | x | 1.000 | 1.000 |
| G10(0) | x | | | | | x | | | x | x | | x | 1.000 | 1.000 |

| Gear VM (EM) | Power-shiftable shift element | | |
|---|---|---|---|
| | I | II | III |
| G1 | A,G,L | A,G,L | C |
| G2(1) | G,L | G,L | D |
| G2(4) | G,L | G,L | D |
| G3(4) | G,L | G,L | E |
| G4 | B,G,L | B,G,L | C |
| G5(4) | L | L | F |
| G5(9) | | | F,L |
| G5(6) | | | F,L |
| G6 | A,H | A,H | C |
| G7(6) | H | H | D |
| G7(9) | H | H | D |
| G8(9) | H | H | E |
| G9 | B,H | B,H | C |
| G10(9) | F,S | F,S | F,S |
| G10 | F,S | F,S | F,S |
| G10(6) | F,S | F,S | F,S |
| G10(0) | F,S | F,S | F,S |

Fig. 4A

| Gear VM (EM) | Power-shiftable shift element (preferable) | | |
|---|---|---|---|
| | I | II | III |
| G1 | A | A | C |
| G2(1) | G | G | D |
| G2(4) | G | G | D |
| G3(4) | G | G | E |
| G4 | B | B | C |
| G5(4) | L | L | F |
| G5(9) | | | F |
| G5(6) | | | F |
| G6 | A | A | C |
| G7(6) | H | H | D |
| G7(9) | H | H | D |
| G8(9) | H | H | E |
| G9 | B | B | C |
| G10(9) | F | F | F |
| G10 | F | F | F |
| G10(6) | | | F |
| G10(0) | | | F |

Fig. 4B

GEARBOX OF A MOTOR VEHICLE AND METHOD FOR OPERATING A MOTOR VEHICLE

This application is a National Stage completion of PCT/EP2016/078432 filed Nov. 22, 2016, which claims priority from German patent application Ser. No. 10 2015 226 251.0 filed Dec. 21, 2015.

FIELD OF THE INVENTION

The invention relates to a transmission of a motor vehicle. In addition, the invention relates to a method for operating a motor vehicle.

BACKGROUND OF THE INVENTION

In this case, a transmission designates in particular a multi-speed transmission, in which a plurality of gears, i.e. fixed transmission ratios between two shafts of the transmission, can be shifted by means of shift elements, preferably automated. Such transmissions are used particularly in motor vehicles, in particular also in commercial vehicles, to suitably adapt the speed and torque output characteristics of the drive unit to the driving resistances of the vehicle.

Vehicles having hybrid drives are known from the prior art. Hybrid drives have two or more different drive sources, wherein to a large extent drive trains having an internal combustion engine and one or more electrical machines as parallel hybrid or as mixed hybrid have become standard. For these variants the flow of power of the internal combustion engine and the electric machine are arranged largely in parallel, permitting both a superposition of the drive torques and driving with purely internal combustion engine drive or purely electric motor drive is possible.

From DE 10 2010 030 573 A1 a hybrid drive having an automated manual transmission is known, which has an internal combustion engine which is connected to at least one first transmission input shaft, having an electric drive with at least one electric machine, which is connected to a second transmission input shaft, having at least one countershaft, having idler gears and fixed gears arranged in several gear set planes, having several gearshift devices and with a transmission output shaft. The two transmission input shafts are arranged coaxially to each other, wherein a gearshift device connects the two transmission input shafts drive-operatively to each other in one of their shift positions, and in another shift position shifts a gear. Thus a partial transmission coupling can be implemented, which couples the two input shafts to each other without shifting a gear.

To achieve the most effective operation of the hybrid drive possible, drive strategies are employed that make flexible use of the electric drive depending on the situation, for example for starting, as a starter generator or as a generator for power generation.

From DE 10 2010 063 582 A1 a device for a drive train of a hybrid vehicle is known, having a planetary gear set having the elements of a planetary carrier, a sun gear and a ring gear, wherein a first element of these elements of the planetary gear set is used for the fixed connection of a first transmission input shaft of a first partial transmission of a transmission, and wherein a second element of these elements of the planetary gear set is used for the fixed connection of an electric machine of a hybrid drive, with a first shift element, by which a third element of these elements of the planetary gear set in a first shift position of the first shift element can be coupled to a second transmission input shaft of a second partial transmission of the transmission, to which additionally an internal combustion engine of the hybrid drive can be coupled, and in a second shift position of the first shift element can be connected to the housing side or to the stator side, and having a second shift element, by which if the second shift element is closed both transmission input shafts of both partial transmissions can be coupled to each other and if the second shift element is open both transmission input shafts of both partial transmissions can be separated from each other. Thus electrodynamic starting and also electrodynamic shifting are possible. Moreover, the electric machine can be used as a starter generator.

SUMMARY OF THE INVENTION

Proceeding from the prior art, the invention addresses the problem of creating an automatic powershift transmission for hybrid applications which combines a variety of advantages of existing manual transmissions and implements them in such a way that a transmission or a drive train including this transmission having low design and construction costs and high efficiency results, which in particular has a transmission-ratio spread and a range for trucks. Further, a method for operating a motor vehicle having a transmission is to be created.

This problem is solved by a transmission according to the independent claims of the patent.

The transmission has a main transmission comprising two partial transmissions connected in parallel, an output shaft, and two planetary gear sets having the elements of a planetary carrier, a sun gear and a ring gear. The main transmission comprises two transmission input shafts, a first gear plane, a second gear plane, a third gear plane, a fourth gear plane and a fifth gear plane. The transmission comprises a first shift element, a second shift element, a third shift element, a fourth shift element and a fifth shift element. A first planetary gear set adjoins the main transmission as a range group such that, in one shift position, the fourth shift element connects the fifth gear plane and an element of the first planetary gear set, and that the fifth shift element in one shift position couples an element of the first planetary gear set to the output shaft and in another shift position fixes it rigidly to the housing. A second planetary gear set is interposed between an electric machine of the hybrid drive and the first transmission input shaft as a planetary stage, such that the electric machine can be connected to an element of the second planetary gear set. The internal combustion engine can be connected to the second transmission input shaft. One of the transmission input shafts has a brake assigned to it.

The first planetary gear set, used as a range group, functions to double the number of gears of the main transmission, wherein two ranges can be shifted, one fast and one slow range. In the first shift position of the fifth shift element, in which the ring gear of the first planetary gear set is connected to the housing, a slow transmission ratio results and in a second shift position of the fifth shift element, in which the ring gear is coupled to the output shaft and thus is interlocked with the planetary gear, a fast transmission ratio is established. The fifth gear plane forms the drive output constant of the main transmission and, aided by the fourth shift element in one of its shift positions, can be coupled to the planetary carrier of the range group. The electric machine can support the traction force by the countershaft, by having the torque transferred directly from the countershaft via the drive output constant to the planetary carrier of the range group and thus to the output shaft connected to the planetary carrier of the range group, while the fifth shift element becomes load-free and can be engaged.

A further advantage of this transmission lies in the fact that when driving in direct gear, the speed of the countershaft can be reduced, in order to reduce drag losses for example at the bearings and seals. Further the electric machine and in particular also the brake, which is assigned to one of the transmission input shafts, can be used if, while driving with an engaged gear in the transmission the or any brake is closed for the purpose of a full brake application at the drive output, to first relieve a shift element of the transmission and subsequently open it to decouple the internal combustion engine from the drive output. Then there is no danger of the internal combustion engine stalling, even though, due to the permanent coupling of the internal combustion engine to the second transmission input, there is no frictionally engaged starting clutch or separating clutch shaft between the internal combustion engine and transmission.

If the brake is assigned to the first transmission input shaft, one clutch half of the brake preferably configured as a frictionally engaged clutch continuously engages with the first transmission input shaft, with which the electric machine also engages with the interconnection of the planetary stage, wherein a second clutch half of the brake is connected to the housing, and wherein the brake is normally open. If the brake is assigned to the second transmission input shaft, one clutch half of the brake preferably configured as a frictionally engaged clutch continuously engages with the second transmission input shaft, to which the internal combustion engine can also be connected, wherein a second clutch half of the brake is connected to the housing, and wherein the brake is normally open. Such a brake can be used to first relieve a shift element of the transmission and subsequently open it to decouple the internal combustion engine from the drive output if the or any brake is closed for the purpose of a full brake application and the electric machine cannot sufficiently support the torque of the internal combustion engine, while a gear is engaged in the transmission at the drive output. There is no danger of the internal combustion engine stalling, even though there is no frictionally engaged starting clutch between the internal combustion engine and the transmission.

The method according to the invention is defined in the independent claims.

If, while driving the motor vehicle with an engaged gear in the transmission the or any brake is closed for the purpose of a full brake application at the drive output, a shift element of the transmission and/or a brake assigned to one of the transmission input shafts is first relieved by the electric machine and subsequently opened to decouple the internal combustion engine from the drive output. There is no danger of the internal combustion engine stalling, even though due to the permanent coupling of the internal combustion engine to the second transmission input shaft there is no starting clutch between the internal combustion engine and transmission.

BRIEF DESCRIPTION OF THE DRAWINGS

Preferred developments are presented in the subclaims and the description below. Embodiments of the invention will be described with reference to the drawings, without being limited thereto. In the figures:

FIGS. 2A and 2B show shifting matrices of the transmission of FIG. 1;

FIGS. 4A and 4B show matrices for further illustration of the invention.

DETAILED DESCRIPTION OF THE PREFERRED EMBODIMENTS

Figure 1:
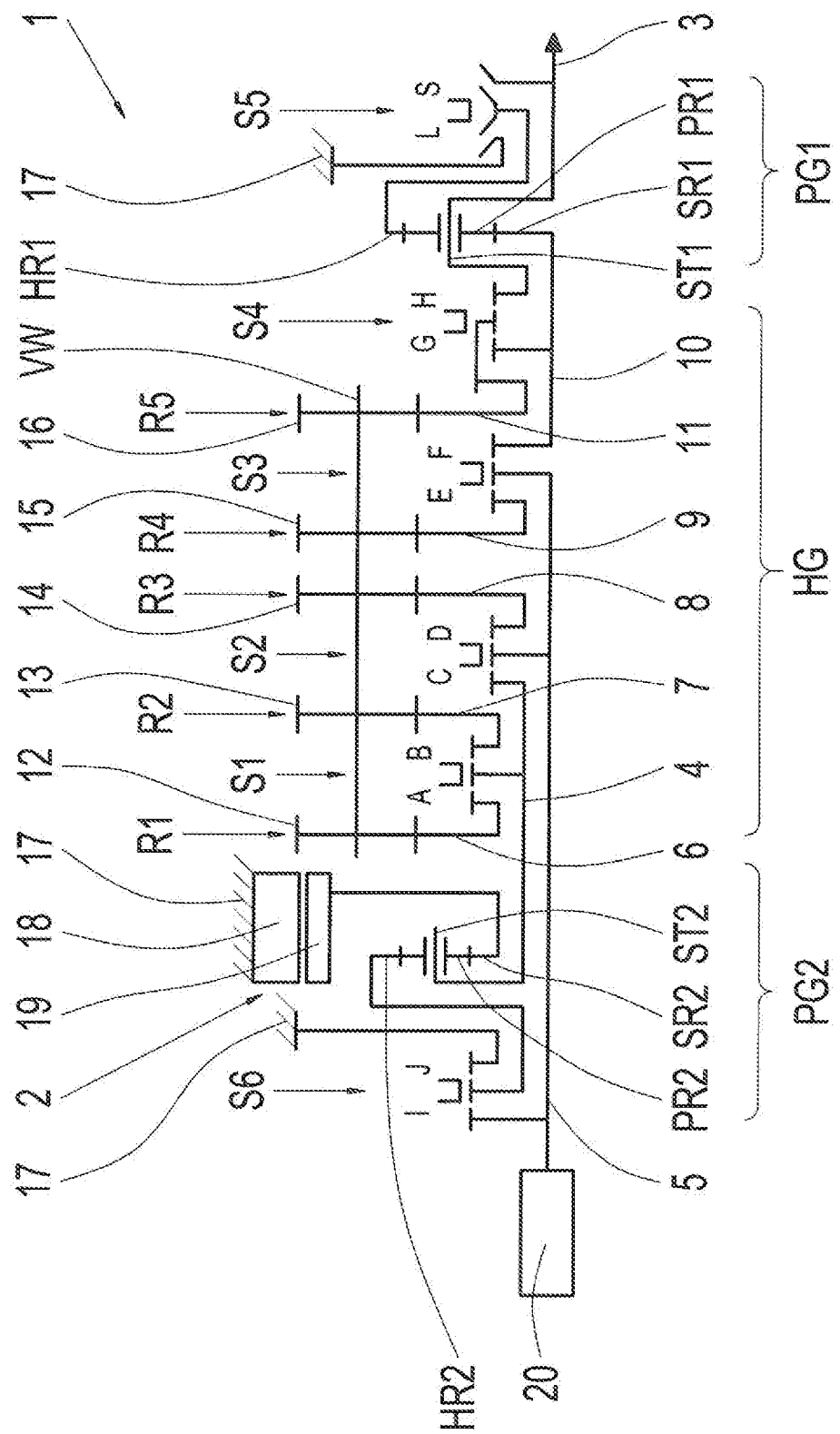
FIG. 1 shows a transmission diagram of a transmission in conjunction with an internal combustion engine and an electric machine.

FIG. 1 shows an embodiment of a transmission 1 having an electric machine 2, having a 5-speed main transmission HG comprising two partial transmissions, having an output shaft 3, a first planetary gear set PG1 and a second planetary gear set PG2, each having the elements of a planetary carrier ST1, ST2, at least one planetary gear PR1, PR2, a sun gear SR1 SR2 and a ring gear HR1, HR2. The first planetary gear set PG1 is used as a range group and adjoins the main group HG. The second planetary gear set PG2 is arranged as a planetary stage between the electric machine 2 and the first transmission input shaft 4. The first transmission input shaft 4 is designed as a hollow shaft and assigned to a first partial transmission of the main transmission HG. A second transmission input shaft 5 is designed as a solid shaft and assigned to the second partial transmission of the main transmission HG.

The main transmission HG comprises a first gear plane R1, a second gear plane R2, a third gear plane R3, a fourth gear plane R4 and a fifth gear plane R5 as well as a first shift element S1, a second shift element S2, a third shift element S3 and a fourth shift element S4. The fifth gear plane R5 forms the drive output constant of the main transmission HG. All the shift elements of the main transmission S1 to S4 are configured as double acting, two-sided shift elements and can connect two different elements of the transmission 1 to a shaft or a transmission component. The first gear plane R1 is formed by a first idler gear 6 of the first transmission input shaft 4 in conjunction with a first fixed gear 12 of a countershaft VW. The second gear plane R2 is formed by an idler gear 7 of the first transmission input shaft 4 in conjunction with a second fixed gear 13 of the countershaft VW.

The third gear plane R3 is formed by a third idler gear 8 on the second transmission input shaft 5 and a third fixed gear 14 of the countershaft VW. The fourth gear plane R4 is formed by a fourth idler gear 9 on the second transmission input shaft 5 and a fourth fixed gear 15 on the countershaft VW. The fifth gear plane R5 is formed by a fifth idler gear 11 on a main shaft 10 and a fifth fixed gear 16 on the countershaft VW.

The main shaft 10 runs coaxially to the transmission input shaft 4, 5 and the output shaft 3, lies between the second transmission input shaft 5 and the countershaft VW and runs parallel to the axis of the transmission input shafts 4, 5 of the main shaft 10 and the output shaft 3. In doing so the first transmission input shaft 4 can be connected by the first shift element S1, in a first shift position A, to the first gear plane R1 or, in a second shift position B, to the second gear plane R2. The second transmission input shaft 5 can be connected by the second shift element S2, in a first shift position C, to the first transmission input shaft 4 or, in a second shift position D, to the third gear plane R3. The second shift element S2 in the first shift position C is thus used for partial transmission coupling. The second transmission input shaft 5 can be coupled by the third shift element S3, in a first shift position E, to the fourth gear plane R4 or, in a second shift position F, to the main shaft 10. Thus, in the shift position F it is possible to shift a direct gear, wherein torque from the second transmission input shaft 5 is transferred by the main shaft 10 and the first planetary gear set PG1 to the output shaft 3. The fourth shift element S4 can in a first shift position G connect the main shaft 10 or in a second shift position H connect the planetary carrier ST1 of the first planetary gear transmission PG1 to the fifth gear plane R5. The drive output constant, the fifth gear plane R5 of the main transmission HG, can thus be coupled by a single shift element, the fourth shift element S4, either to the sun gear SR1 or to the planetary carrier ST1 of the first planetary gear set PG1, since the main shaft 10 is directly connected to the sun gear SR1 of the first planetary gear set. Due to the resulting possible coupling of the electric machine 2 by the drive output constant to the planetary carrier ST1 of the first planetary gear set PG1, the fifth shift element S5 becomes load-free and can be engaged. The electric machine 2 thus supports the traction force by the countershaft VW, so that the range group PG1 can be shifted using traction support. A further advantage of coupling the electric machine 2 to the planetary carrier ST1 is that the speed of the countershaft VW, when driving in direct gear, can be decreased to reduce drag losses on bearings and seals. Each of the shift elements S1 to S4 can also be shifted to neutral, preventing it from connecting any of the mentioned elements to each other.

The transmission 1 comprises the range group in the form of the first planetary gear set PG1. The range group PG1 is used to double the number of gears of the main transmission HG. For this purpose a fifth shift element S5, which is assigned to the range group PG1, can in a first shift position L connect the ring gear HR1 of the first planetary gear set PG1 to a component 17 fixed to the housing or a housing part or to another rotationally fixed component of the transmission 1. As a result a slow range is formed. In a second shift position S of the fifth shift element S5, the ring gear HR1 of the first planetary gear set PG1 can be connected to the output shaft 3 and thus also to the planetary carrier ST1 of the first planetary gear set PG1. The planetary carrier ST1 is connected in rotationally fixed manner to the output shaft 3. In that way the components of the planetary carrier ST1 and ring gear HR1 are interlocked in the second shift position S of the shift element S5 and form a fast range. The shift element S5 can also be shifted to neutral.

The second planetary gear set PG2 is arranged as a planetary stage between an electric machine 2 and the first transmission input shaft 4. The electric machine 2 has a stator 18, which is connected in rotationally fixed manner to a component 17 fixed to the housing, preventing the stator 18 from turning. A pivoted rotor 19 of the electric machine 2 is permanently connected in a rotationally fixed manner to a planetary gear set shaft of the second planetary stage PG2 configured as a sun gear SR2 of the second planetary gear set PG2.

The planetary carrier ST2 of the second planetary gear set PG2 is permanently connected in a rotationally fixed manner to the first transmission input shaft 4. The ring gear HR2 of the second planetary gear set PG2 can be connected by a sixth shift element S6, which is assigned to the second planetary gear set PG2, in a first shift position I to the housing of the second transmission input shaft 5 and in a second shift position J of the sixth shift element S6 it can be fixed rigidly to the housing. In the first shift position I of the sixth shift element S6, the planetary stage PG2 can act as a speed modulation gearbox. In the second shift position J of the sixth shift element S6, the planetary stage PG2 acts as a fixed preliminary transmission for the electric machine 2. As a result, the electric machine 2 can be designed cost-effectively at less torque, but at higher speed. The shift element S6 can also be shifted to neutral.

Due to the arrangement of the electric machine 2 having the planetary stage PG2 on the first transmission input shaft 4, the electric machine 2 is assigned to the first partial transmission.

The second transmission input shaft 5 is driven by a second drive, namely by an internal combustion engine 20. The internal combustion engine 20 is thus permanently connected or can be permanently connected to the second transmission input shaft 5.

Shiftable gears are assigned to every partial transmission by the assigned gear planes R1 to R5.

The first gear plane R1 and the second gear plane R2 of the main transmission HG are assigned to the first transmission input shaft 4 and thus to the first partial transmission of the main transmission HG. This enables purely electric driving by the two gears, which are formed by the two gear planes R1 and R2. In doing so, the range group PG1 produces four shiftable purely electric gears. Driving in reverse is enabled by changing the direction of rotation of the electric machine 2. A separating clutch or starting clutch for the internal combustion engine 20 is not necessary and not available for pure electric driving, as the second transmission input shaft 5 can be decoupled by opening the second and third shift elements S2. S3.

The third gear plane R3 and the fourth gear plane R4 of the main transmission HG are assigned to the second transmission input shaft 5 and thus the second partial transmission of the main transmission HG. The fifth gear plane R5 is used as a drive output constant for both partial transmissions of the main transmission HG. Due to the partial transmission coupling by the second shift element S2 in the first shift position C the internal combustion engine 20 and the electric machine 2 can nevertheless use the gears of the corresponding partial transmission. However, because the second shift element S2 is designed as a double shift element, double acting two-sided shift element, the electric machine 2 cannot use the third gear plane R3 of the main transmission HG.

Due to the two partial transmissions, the internal combustion engine 20 and electric machine 2 can be operated at different transmission ratios. Thus, in each case suitable operating points can be selected for the internal combustion engine 20 and for the electric machine 2 depending on the driving situation. The electric machine 2 can in some cases also be completely decoupled and be stationary and thus avoid no-load losses. The electric machine 2 can be decoupled by the first and the second shift elements S1 and S2, which may not connect the first transmission input shaft 4 to a further component, as well as the sixth shift element 86, which may not couple the ring gear HR2 of the planetary stage to the second transmission input shaft 5.

Due to the partial transmission coupling by the second shift element S2 in shift position C, the internal combustion engine 20 can be connected to the electric machine 2 without transmitting torque to the output shaft 3. In doing so at least the first shift element and the third shift element 83 of the main transmission HG are not actuated, but rather in a neutral position. As a result, the internal combustion engine 20 can be started using the electric machine 2 or power can be generated in neutral, i.e. regardless of the driving speed, even if stopped. In doing so the internal combustion engine 20 drives the electric machine 2. The electric machine 2 operates as a generator.

FIG. 1 shows only the upper half of the gear set of the transmission 1 which is symmetrical to the axis of the transmission input shafts 4, 5, of the main shaft 10 and the output shaft 3. Mirroring at this axis leads to a variant having two countershafts VW, which are used for power distribution. However, the gear set is functionally identical to the design variant with only one countershaft VW. This means that the countershaft VW including the associated fixed gears 12, 13, 14, 15, 16 is not mirrored.

The embodiment according to the invention of FIG. 1 can be used to implement a stalling function known as EDA, electrodynamic starting. In doing so, the electric machine 2 can be used purely for starting and acceleration or only to support the internal combustion engine 20.

For starting in the purely-electric mode an increased starting torque can provided by the second planetary gear set PG2 acting as a constant gear ratio. For starting electrodynamically, the sixth shift element S6 must be in its first shift position I. If the sixth shift element S6 is in its first shift position I, the transmission 1 is in EDA mode. Afterwards a gear of the first partial transmission, which is assigned to the first transmission input shaft 4, is engaged and the second partial transmission is shifted to neutral, without the transmission of torque. The first gear G1 of the transmission 1 is assigned to the first gear plane R1 in FIG. 1. In doing so the first gear plane R1 is assigned to the first partial transmission.

Thus, for electrodynamic starting the first shift element S1 can be used in its first shift position A and in the further flow of force the fourth shift element 34 can be in its first shift position C for the first gear G1 and the fifth shift element S5 can be in its first shift position L. Thus in first gear G1 a flow of force is prepared in the slow range from the first transmission input shaft 4 by the first gear plane R1, the countershaft VW, the drive output constant R5, the main shaft 10 and the range group PG1. If the vehicle is stopped the internal combustion engine 20 rotates e.g. at idling speed and the electric machine 2 rotates backwards, bringing the planetary carrier ST2 of the planetary stage PG2 to a standstill. The torque ratios on the planetary stage PG2 are constant. The torque of the internal combustion engine 20 and the torque of the electric machine 2 are summed up on the planetary carrier ST2 of the planetary stage PG2. During electrodynamic starting the speed of the electric machine 2 changes to direct drive on the planetary stage PG2. Starting can be terminated by bringing the second shift element S2 to its first shift position C, and thus interlocking the planetary stage PG2.

If the transmission 1 is operated in EDA mode, electrodynamic shifting (EDS) is possible as a load shifting function. In doing so, the sixth shift element S6 remains in its first shift position I in EDA mode. A gear assigned to the first partial transmission and thus the first transmission input shaft 4 must be engaged. This is used as a supporting gear, by which the flow of force is conducted during the power-shifting. The supporting gear can be identical to the actual gear or a target gear. However, a further gear of the first partial transmission can also be used. The shifting method begins with a load transfer phase. For that purpose the torques on the internal combustion engine 20 and the electric machine 2 are set in such a way that they match the stationary transmission ratio of the planetary gear stage PG2. As a result there is only a flow of force by the planetary carrier ST2 of the planetary gear stage PG2 and the supporting gear. All other shift elements become load-free. The load-free shift elements of the actual gear are disengaged. The speed of the internal combustion engine 20 and the electrical machine 2 is regulated such that the shift element of the target gear to be engaged becomes synchronous.

Once synchronicity has been established, the shift element of the target gear is engaged. Now the shifting operation is completed and the load on the electric machine 2 can be reduced as needed. The EDS shifting method has the advantage that the shift element of the target gear to be shifted is synchronized by the interaction of the electric machine 2 and the internal combustion engine 20, wherein the electric machine 2 can be easily regulated. A further advantage of the EDS shifting method is that a high traction force can be achieved, as the torques of the internal combustion engine 20 and the electrical machine 2 on the second planetary gear set PG2 are summed up.

For the transmission of FIG. 1, it is likewise possible to implement a function known as ISG, integrated starter generator, in which the internal combustion engine 20 can be started and accelerated by the electric machine 2 and the electric machine 2 can also be used as a generator. In ISG mode the sixth shift element S6 is in its second shift position J and connects the ring gear HR2 to a component 17 fixed to the housing.

FIGS. 2A and 2B show shifting matrices of the transmission of FIG. 1. The gear ratios i and gear speed increments phi given there by way of example are based on a stationary transmission ratio i0 of the planetary gear set PG2 of −2, on a stationary transmission ratio i0 of the planetary gear set PG1 of −2.713, on transmission ratios i1, i2, i3, i4 and i5 of the gear plane R1 of −1.3, R2 of −0.592, R3 of −1, R4 of −0.769 and R5 of −2.197. The negative sign refers to a reversal of the direction of rotation. Of course, different numerical values can also be assumed for the transmission ratios.

The transmission ratios of the spur gear pairs are given in the following direction of the flow of force: first, second, third and fourth gear plane R1, R2, R3, R4: from the two transmission input shafts 4, 5 to the countershaft VW. Fifth gear plane R5: from the countershaft VW to the main shaft 10.

FIG. 2A shows a shifting matrix of the transmission 1 for the ten gears G1 to G10 from the perspective of the internal combustion engine 20 in ISG mode. The sixth shift element S6 remains in its second shift position J. The gears G1 to G10 are listed in the first column. If the internal combustion engine 20 transmits a flow of force by the second partial transmission, via the solid shaft 5, then a gear can be preselected in the force-flow-free first partial transmission, via the hollow shaft 4, or the partial transmissions can be coupled. The preselection gear is specified behind the gear number in brackets. For example, for gear G2(1) the second gear G2 is active for the internal combustion engine 20, the first gear G1 is preselected for the internal combustion engine 20 and simultaneously already active for the electric machine 2. At the same time, it is shown in the columns subsequent to the gears G1 to G10 which shift elements S1-S6 are in which shift positions A to J. An x indicates a closed shift position A to J. Following the columns of shift elements S1-S6 there is a column containing exemplary gear ratios i and a column containing exemplary gear speed increments phi for every gear G1 to G10.

The power flow in the first gear G1 is, as illustrated in FIG. 2A, conducted via the second transmission input shaft 5, the second shift element S2 in its first shift position C, the first shift element S1 in its first shift position A, the first gear plane R1, the countershaft VW, the drive output constant R5 the fourth shift element S4 in its first shift position G, the range group PG1 shifted in the slow range to the output shaft 3.

The power flow in the second gear G2 is routed via the second transmission input shaft 5, the second shift element S2 in its second shift position D, the third gear plane R3, the countershaft VW, the drive output constant R5, the fourth shift element S4 in its first shift position G, the range group PG1 shifted into the slow range to the output shaft 3. In doing so, the first gear G1 and thus the first gear plane R1 can be preselected by the first shift element S1 in its first shift position A and the fourth gear G4 and thus the second gear plane R2 can also be preselected by the second shift position B. The preselected gears G1 G4 are assigned to the first partial transmission.

The power flow in the third gear G3 is routed via the second transmission input shaft 5, the third shift element S3 in its first shift position E, the fourth gear plane R4, the countershaft VW, the drive output constant R5, the fourth shift element S4 in its first shift position G, the range group PG1 shifted into the slow range to the output shaft 3. In doing so, the fourth gear G4 and thus the second gear plane R2 can be preselected by the first shift element S1 in its second shift position B.

The power flow in the fourth gear G4 is routed via the second transmission input shaft 5, the second shift element S2 in its first shift position C, the first transmission input shaft 4, the first shift element S1 in its second shift position B, the second gear plane R2, the countershaft VW, the drive output constant R5, the fourth shift element S4 in its first shift position G, and the range group PG1 shifted in the slow range to the output shaft 3.

The power flow in the fifth gear G5 is routed via the second transmission input shaft 5, the third shift element S3 in its second shift position F, the range group PG1 shifted into the slow range to the output shaft 3. In doing so the fourth gear G4 can be preselected by the first shift element S1 in its second shift position B and by the fourth shift element S4 in its first shift position G. Alternatively, the ninth gear G9 can be preselected by the first shift element S1 in its second shift position B and by the fourth shift element S4 in its second shift position H. Likewise the sixth gear G6 can be preselected by the first shift element S1 in its first shift position A and by the fourth shift element S4 in its second shift position H.

The power flow in the sixth gear G6 is routed via the second transmission input shaft 5, the second shift element S2 in its first shift position C, the first transmission input shaft 4, the first shift element S1 in its first shift position A, the first gear plane R1, the countershaft VW, the drive output constant R5, the fourth shift element S4 in its second shift position H and via the range group PG1 shifted into the fast range to the output shaft 3.

The power flow in the seventh gear G7 is routed via the second transmission input shaft 5, the second shift element S2 in its second shift position D, the third gear plane R3, the countershaft VW, the drive output constant R5, the fourth shift element S4 in its second shift position H and by the range group PG1 shifted into the fast range to the output shaft 3. In this case, the sixth gear G6 can be connected upstream by the first shift element S1 in its first shift position A or the ninth gear G6 can be connected upstream by the first shift element S1 in its second shift position B.

The power flow in the eighth gear G6 is routed via the second transmission input shaft 5, the third shift element S3 in its first shift position E, the fourth gear plane R4, the countershaft VW, the drive output constant R5, the fourth shift element S4 in its second shift position H and by the range group PG1 shifted into the fast range to the output shaft 3. In this case, the ninth gear G6 can be connected upstream by the first shift element S1 in its second shift position B.

The power flow in the ninth gear G9 is routed via the second transmission input shaft 5, the second shift element S2 in its first shift position C, the first transmission input shaft 4, the first shift element S1 in its second shift position B, the second gear plane R2, the countershaft VW, the drive output constant R5, the fourth shift element S4 in its second shift position H and by the range group shifted in the fast range, which is provided by the first planetary gear set PG1, to the output shaft 3.

The power flow in the tenth gear G10 is routed via the second transmission input shaft 5, the third shift element S3 in its second shift position F, the main shaft 10 and by the range group PG1 shifted in the fast range to the output shaft 3. In this case it is advantageous, if in addition the second shift element S2 is shifted in its first shift position C, as in this way the first transmission input shaft 4 is routed at a defined speed, here the speed of the second transmission input shaft 5. In this case the ninth gear G6 can be connected upstream by the first shift element S1 in its second shift position B and the fourth shift element S4 in its second shift position H. However, the sixth gear G6 can also be connected upstream by the first shift element S1 in its first shift position A and the second shift element S2 in its first shift position C. Hence it is possible to lower the countershaft speed. The preselection of the first shift element S1 in its first shift position A can be used to cause a standstill of the electrical machine 2 and the countershaft VW in the tenth gear.

In the sixth, seventh, eight and ninth gears G6 to G9 of the transmission, the fifth shift element S5 can also remain closed in the first shift position L instead of in the shift position S, as the fifth shift element S5 is load-free in both shift positions L and S, if the flow of force is conducted via the fourth shift element S4 in the second shift position H directly to the planetary carrier ST1 of the first planetary gear set PG1. However, due to the speed ratios at the range group PG1 it is advantageous to perform the change of the fifth shift element S5 from the first shift position L to the second shift position S as soon as possible.

As a rule, the gears of the range group are shifted without interrupting the flow of traction force PG1 when changing from fifth gear G5 to sixth gear G6. In the fifth gear G5, for driving an internal combustion engine or hybrid driving in ISG mode; it is shifted by a direct gear in the slow range group PG1. The third shift element S3 is in its second shift position F and the fifth shift element is in its first shift position L. This can also be seen in FIG. 2A in the row G5(4).

Due to the background, the electric machine 2 is still operating in the fourth gear G4, wherein the first shift element S1 is in its second shift position B and the fourth shift element S4 is in its first shift position G. To shift to sixth gear G6 without interrupting the flow of traction force, the following procedural steps are performed:

If a load is present on the electric machine 2, the load is reduced here. To do so the internal combustion engine 20 takes over the load. Subsequently the fourth shift element S4 can be opened from the shift position G. The second shift position H of the fourth shift element S4 is actively synchronized by the speed regulator of the electric machine 2. To this end the speed of the electric machine 2 must be lowered. The speed is reduced by the factor of the transmission ratio of the range group PG1, which in the numerical example from FIG. 2A corresponds to a factor of 3.713. Subsequently the fourth shift element S4 can be power-shifted to the second shift position H. This corresponds to the row of the gear 5 (9) in the shifting matrix FIG. 2A. In the transition, in this state the ninth gear G9 is preselected, as the first shift element S1 is still in its second shift position B. It can now be opened in a load-free manner. The first shift position A of the first shift element S1 is now actively synchronized by the speed regulator of the electric machine 2. To this end the speed of the electric machine 2 must be increased to the target speed level of the sixth gear G6. The speed is increased in accordance with the relationship of the gear ratio of the two gears, which are assigned to the first transmission input shaft. Here these are the first and the fourth gear G1, G4, which means a speed increase by a factor of 1.3/0.592=2.2. Hence, the first shift element S1 can be brought load-free to shift position A, wherein simultaneously the subsequent gear, the sixth gear G6, is preselected. Subsequently a load transition takes place from the internal combustion engine 20 to the electric machine 2. This means that only the electric machine 2 supports the traction force in the target gear, the sixth gear G6. Once the internal combustion engine 20 is load-free, the second shift position F of the third shift element S3 is opened.

Optionally, now it is possible to change the fifth shift element S5 from the first shift position L to its second shift position S while the shift position F of the third shift element S3 is opened. This offers the advantage that only the main shaft 10 and thus a low inertial mass acts on the sun gear SR1 of the first planetary gear set PG1. The synchronization itself takes place by the shift element S5, which is executed synchronized. The second shift position S of the fifth shift element S5 can subsequently be closed.

The second shift position S cannot be actively synchronized with the internal combustion engine 20, because the internal combustion engine 20 cannot lower the speed far enough, as here the speed level of the tenth gear G10 (the third shift element S3 and the fifth shift element S5 in the second shift positions F and S respectively) would be required, even though the sixth gear G6 is the target gear. The change from the first shift position L of the fifth shift element S5 to the second shift position S of the fifth shift element S5 here is, as already mentioned, advantageous but not absolutely necessary. The change can also be effected at a later time and not in the context of the shifting from fifth gear G5 to sixth gear G6. The fifth shift element S5 would then for the time being remain in the first shift position L.

Immediately after the shift position F of the third shift element S3 has been opened, that means if applicable simultaneously with the step just mentioned, the internal combustion engine 20 is synchronized to the target speed of the sixth gear CS. Hence the first shift position C of the second shift element is synchronized and can subsequently be closed in a load-free manner. Hence the sixth gear G6 is engaged and the shifting operation for the shift elements S1-S6 is concluded. The transition of load from the electric machine 2 to the internal combustion engine 20 can be effected subsequently depending on the operating strategy.

In summary, to go from fifth gear G5 to sixth gear CS, both the fourth shift element S4 and the first shift element S1 must be shifted. In doing so, first the fourth shift element S4 is changed and only then the first shift element S1. As a result the electric machine 2 first lowers its speed and can be synchronized at high torque.

Less energy is required to change the speed of the inertial mass of the rotor 19, If the first shift element S1 were shifted first, the speed of the electric machine 2 would increase dramatically in the meantime and there would be the danger of an overspeed, a low torque of the electric machine 2 at a higher speed.

The method is independent from the preliminary transmission ratio of the planetary stage PG2 for the electric machine 2. It also works without a planetary stage PG2, then the electric machine 2 or the rotor 19 would be directly connected to the first transmission input shaft 4.

As already described, in the direct gear, the tenth gear G10 (see FIG. 2A) in ISG mode the speed of the countershaft VW or the countershafts can be lowered. In doing so in ISG mode the sixth shift element S6 in the second shift position J remains closed. The vehicle is powered by the internal combustion engine, wherein the third shift element S3 is in its second shift position F. Due to its history, the fourth shift element S4 is in its second shift position H. As a result, in the numerical example cited above the speed of the countershaft VW is higher by a factor of 2.197 than that of the internal combustion engine 20. This corresponds to the spur gear transmission ratio i of the fifth gear plane R5. The sun gear SR1 and the planetary carrier ST1 of the range group PG1 have identical speeds, as the range group PG1 is locked in its second shift position S by the fifth shift element. The reduction of the speed of the countershaft VW improves the overall efficiency of the transmission 1 in direct gear G10. Lower speed means less drag loss or power loss on the bearings and seals. For this purpose load-free shift elements can be closed. For the present gear set it is advantageous to move the first shift element S1 to its first shift position A. The speed of the countershaft VW is then only (1/1.3=0.769) 0.769 times that of the internal combustion engine 20. The speed of the countershaft VW can also be lowered to zero. In doing so, drag losses on the bearings could be prevented.

Countershaft VW is synchronized to the target speed by regulating the speed of the electric machine 2. For this purpose the shift element of the highest gear of the first partial transmission is closed first, unless it is already closed from before. In the example shown here this is the first shift element in the second shift position B formed by the fourth gear G4 by the second gear plane R2. Thus, the electric machine 2 itself also does not reach a high level of speed and can therefore be synchronized faster.

Conventional synchronizations are not conducted under load either. In the shifting matrix in FIG. 2A in the tenth gear with an upstream sixth gear G10(6) the speed of the countershaft VW is lowered and in the tenth gear with a preselected idle G10(0), the speed of the countershaft VW and the speed of the electric machine 2 are reduced to zero. Here too the speed of the countershaft VW is changed by means of the electric machine 2.

FIG. 2B shows an associated shifting matrix of the transmission 1 for the ten gears G1 to G10 from the perspective of the internal combustion engine 20 in EDA mode. The sixth shift element S6 remains in its first shift position Otherwise the shifting matrix in EDA mode is identical to the shifting matrix in ISG mode from FIG. 2A. However, different speed ratios result on the electric machine 2 and on the planetary stage PG2.

Shifting gears of the range group PG1 without interrupting the flow of traction force when changing from fifth gear G5 to sixth gear G6 can also be performed in EDA mode. In doing so the sixth shift element S6 is always in its first shift position I. In fifth gear G5 for internal combustion engine or hybrid driving in EDA mode; the former is shifted by a direct gear in the slow range group PG1. The third shift element S3 is in its second shift position F and the fifth shift element is in its first shift position L. This is likewise evident in FIG. 2B in row G5(4). Due to its history, the electric machine 2 is still operating in fourth gear G4, wherein the first shift element SW1 is in its second shift position B and the fourth shift element S4 is in its first shift position G.

In order to shift to sixth gear G6 now, without interrupting the flow of traction force, the following procedural steps are performed: If load is present on the electric machine 2, a load reduction is performed there. In doing so the internal combustion engine 20 assumes the load. Subsequently the fourth shift element S4 can be opened from the shift position G. The second shift position H of the fourth shift element S4 is actively synchronized by the speed regulator of the electric machine 2.

To this end, the speed of the planetary carrier ST2 of the planetary stage PG2 must be lowered, which is effected by reducing the speed of the electric machine 2. The speed at the planetary carrier ST2 of the planetary stage PG2 is decreased by the factor of the transmission ratio of the range group PG1. Subsequently the fourth shift element S4 can be shifted free of load to the second shift position H. This corresponds to the row of gear 5 (9) in the shifting matrix FIG. 2B. In the transition, the ninth gear G9 is preselected in this state, as the first shift element S1 is still in its second shift position B. It can now be opened in a load-free manner. The first shift position A of the first shift element S1 is now actively synchronized by the speed regulator of the electric machine 2. To this end, the speed of the planetary carrier ST2 of the planetary stage PG2 must be increased by means of the electric machine 2 to the target speed level of the sixth gear G6. The speed increase is effected by the relationship of the gear ratio of the two gears, which are assigned to the first transmission input shaft. In this case, these are the first and the fourth gear G1, G4. Hence the first shift element S1 can be moved to the first shift position A in a load-free manner, wherein simultaneously the subsequent gear, the sixth gear G6, is preselected. Then the torques of the internal combustion engine 20 and the electrical machine 2 are set such that they are in proportion to the stationary transmission ratio of the planetary stage PG2, such that the third shift element S3 that is to be disengaged becomes load free. The flow of force then runs exclusively via the planetary carrier ST2 of the planetary stage PG2 via the target gear, the sixth gear G6, via the first shift element S1 in the first shift position A and the fourth shift element in the second shift position H. Simultaneously, the torques of the internal combustion engine 20 and the electrical machine 2 are set within the limits of the two work machines such that the traction force comes as close as possible to the target value desired by the driver or a driving strategy function. Once the third shift element S3 is load free, the second shift position F of the third shift element S3 is opened.

Optionally, now it is possible to change the fifth shift element S5 from the first shift position L to its second shift position S while the shift position F of the third shift element S3 is open. This offers the advantage that only the main shaft 10 and thus a low inertial mass acts on the sun gear SR1 of the first planetary gear set PG1.

Synchronization itself takes place by the shift element S5, which is designed in syncromesh. The second shift position S of the fifth shift element S5 can subsequently be closed. The change from the first shift position L to the second shift position S of the fifth shift element S5 at this time is, as already mentioned, advantageous but not absolutely necessary. The change can also occur outside of the shifting from fifth gear G5 to sixth gear G6 at a later time. The fifth shift element S5 would then for the time being remain in the first shift position L.

Immediately after the shift position F of the third shift element S3 has been opened, that means if applicable simultaneously with the step just mentioned, the torques of the internal combustion engine 20 and the electrical machine 2 are controlled or regulated such that the speed of the internal combustion engine 20 decreases to the target speed. Hence, the first shift position C of the second shift element S2 is synchronized and can subsequently be closed in a load-free manner. Hence the sixth gear G6 is engaged and the shifting operation for the shift elements S1-S5 is concluded. The load transition from the electric machine 2 to the internal combustion engine 20 can be effected subsequently, depending on the operating strategy.

In summary, to go from fifth gear G5 to sixth gear G6 in EDA mode, both the fourth shift element S4 and the first shift element S1 must be shifted. To that end, first the fourth shift element S4 is changed and only then the first shift element S1. As a result, first the speed of the electric machine 2 is lowered and can then be synchronized at high torque. Less energy is required to change the speed of the inertial mass of the rotor 19.

If the first shift element S1 were shifted first, the speed of the electric machine 2 would increase dramatically in the meantime and there would be the danger of an overspeed, a low torque of the electric machine 2 at a high speed.

For the first and the fourth shift element S1 and 34, in each case a load-free speed synchronization is effected by means of the electric machine 2. In doing so, due to inertial masses a dynamic torque is supported on the ring gear HR2 of the planetary stage PG2, which could have a negative impact on the driving comfort, because the ring gear HR2 of the planetary stage PG2 is connected to the second transmission input shaft 5 by the sixth shift element S6 in the first shift position I. Therefore, shifting from EDA mode to ISG mode prior to the speed synchronization and corresponding synchronization would also be possible. After the relevant speed synchronization the mode reverts to EDA mode.

Different gear assignments are also conceivable in the main transmission HG. For example, the second gear plane R2 and the fourth gear plane R4 can be interchanged. Then the gear planes for the third gear G3 and the fourth gear G4 would be interchanged.

One or more mechanical reverse gears can be added. This can be implemented either as an additional spur gear plane having an additional shift element or as a planetary changing set having two additional shift elements, one for forward and one for reverse. In addition, a so-called GPR range group can be used, in which case the reverse gear is integrated in the range group.

As stated above, the electric machine 2 is permanently connected to an element, namely to the sun gear SR2, of the second planetary gear set PG2, wherein the second planetary gear set PG2 is permanently coupled by another element of the same, namely by the planetary carrier ST2, to the first transmission input shaft 4.

The internal combustion engine 20 is permanently connected to the second transmission input shaft 5, there being no separating clutch or starting clutch between the internal combustion engine 20 and the second transmission input shaft 5.

If such a drive train with an engaged gear in the transmission 1 is used for driving and a full brake application is initiated, the speed of the internal combustion engine 20 can drop below its idling speed with the result being staffing of the internal combustion engine 20. A full brake application braking is to be understood as a braking action in which the actuation of a brake pedal and thus the actuation of the brake at the output side exceeds a limit value, in which case the decrease in speed of the motor vehicle is greater than a corresponding limit value. The invention relates to such details, which can be used to prevent the internal combustion engine 20 from stalling in the case of a full brake application.

Figure 3A:
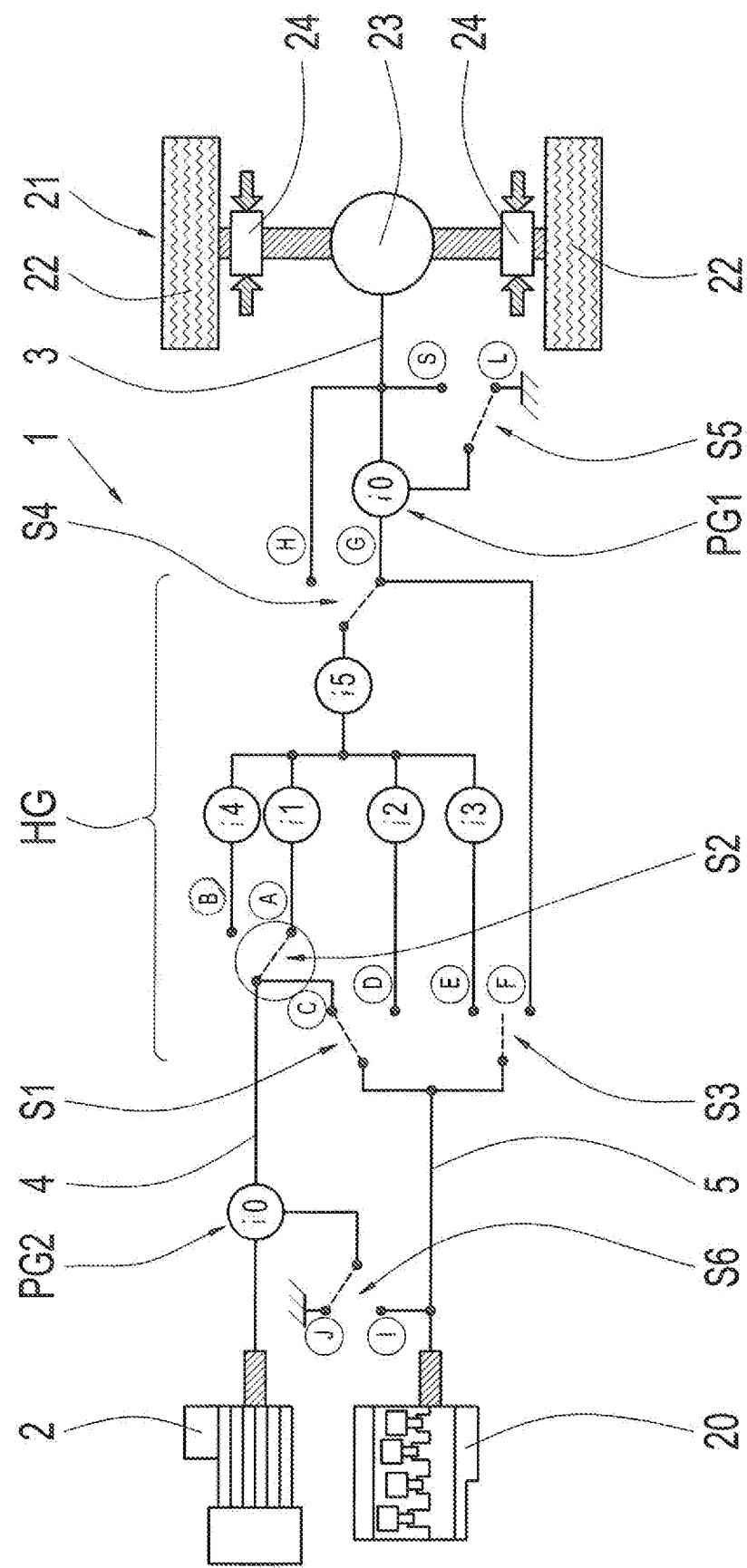
FIGS. 3A to 3C show drive train schemes of a motor vehicle having the transmission of FIG. 1 and developments of the transmission of FIG. 1 in each case with the first gear engaged in the transmission.

FIG. 3A shows the transmission 1 of FIG. 1 more schematized in conjunction with the electric machine 2, the internal combustion engine 20 and a drive output 21, wherein the drive output 21 comprises wheels 22, an axle drive 23 and brakes 24 at the output side. In FIG. 3A the transmission 1 is in so-called ISG mode, i.e. the shift element S6 is its shift position J. In FIG. 3A the gear G1 is engaged, in which the shift element S1 takes the shift position A, the second shift element S2 takes the shift position C and the shift element S4 takes the shift position G. The shift element S3 is in neutral. The shift element S5 takes the shift position L.

If a full brake application is now initiated by actuating the brakes 24 at the output side while driving with an engaged gear G1 in the transmission 1, by closing the brakes 24 for the purpose of a full brake application, to prevent the internal combustion engine 20 from staffing, first a shift element of the transmission 1 is relieved, namely in FIG. 3A by the electric machine 2, wherein after relieving this shift element of the transmission 1 the same is opened, in order to decouple the internal combustion engine 20 from the drive output 21 and thus prevent staffing of the internal combustion engine 20. In FIG. 3A the first shift element S1 is relieved by the electric machine 2 and to decouple the internal combustion engine 20 from the drive output 21 is brought from shift position A to neutral.

Figure 3B:
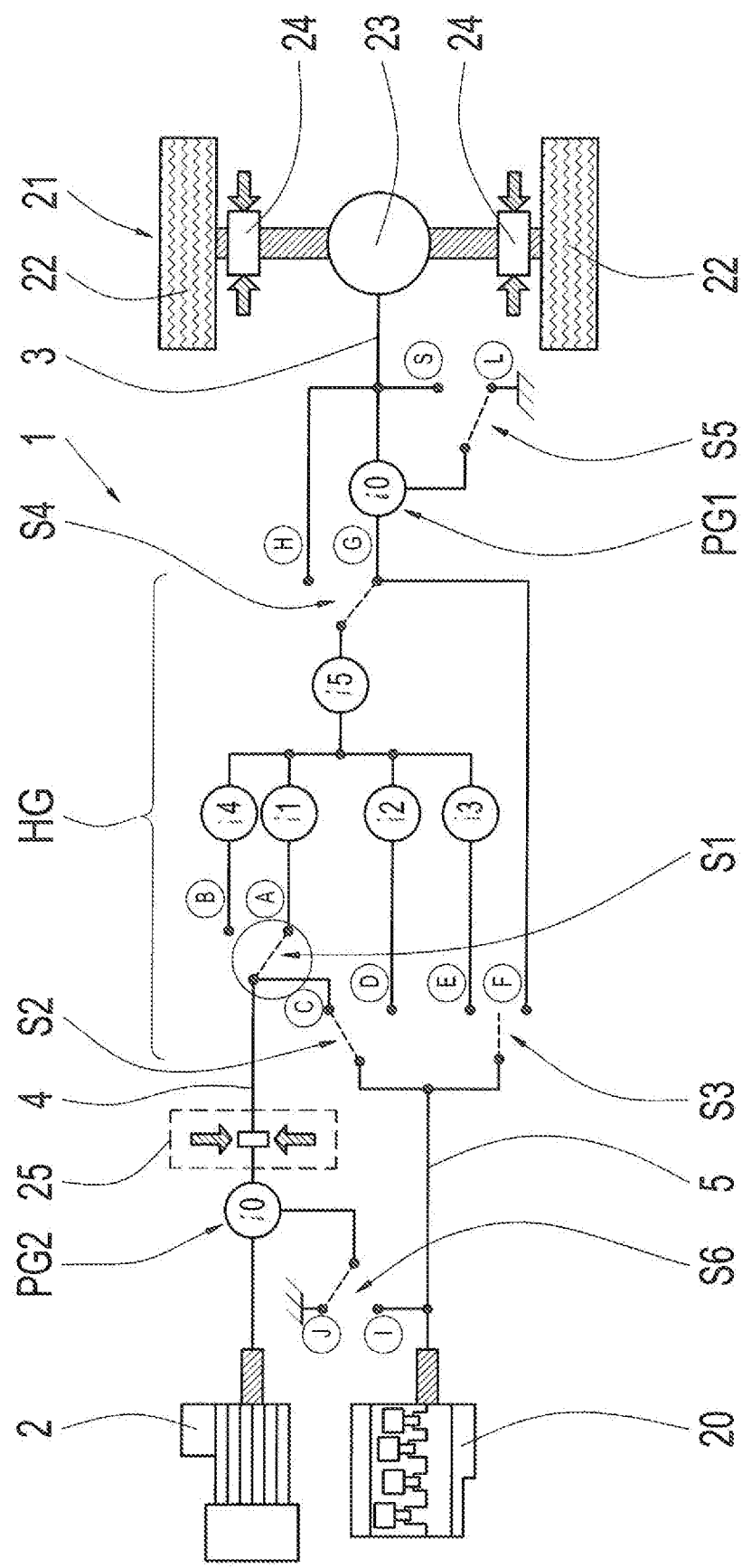

FIG. 3B on the other hand shows the drive train of FIG. 3A with an engaged gear G1 in the transmission 1, wherein in contrast to the exemplary embodiment of FIG. 3A, the transmission 1 comprises an additional brake 25, which in FIG. 3B is assigned to the first transmission input shaft 4. In this case, to decouple the internal combustion engine 20 from the drive output 21 when triggering a full brake application, the first shift element S1, which is in shift position A, can also be relieved by the brake 25 assigned to the first transmission input shaft 4, in order to subsequently move the shift element S1 from shift position A to neutral and thus decouple the internal combustion engine 20 from the drive output 21 in order to protect the former from stalling.

Figure 3C:
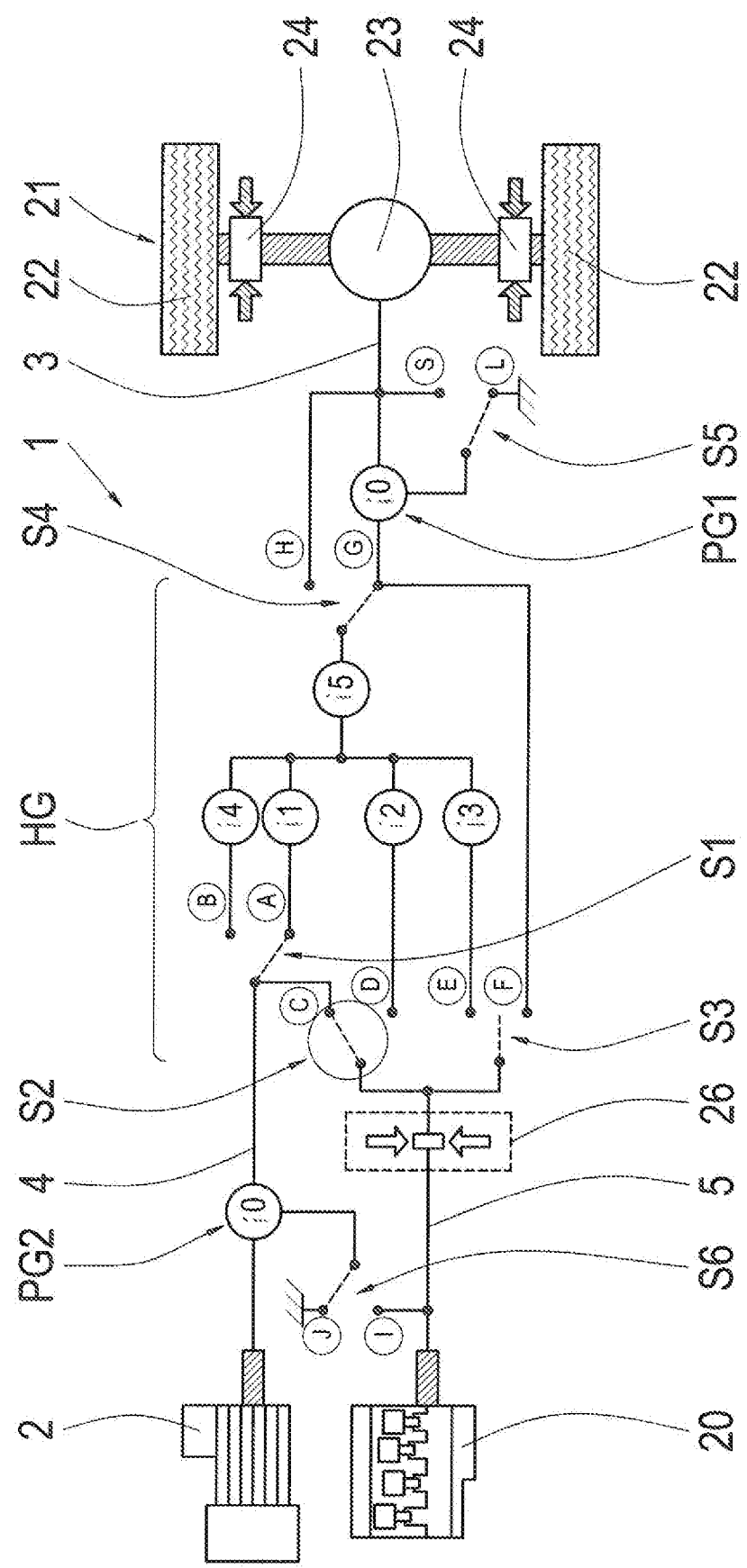

FIG. 3C shows a variant, in which a brake 26 is assigned to the second transmission input shaft 5, wherein then upon the initiation of a full brake application by this brake 26, a shift element, namely the second shift element S2 is relieved with respect to its shift position C, in order to open the second shift element S2 subsequently to provide protection from stalling for the internal combustion engine 20, namely moving it from the shift position C to neutral.

While in FIG. 3A the first gear is engaged in the transmission 1 in ISG mode to protect the internal combustion engine 20 from stalling when triggering a full brake application a shift element of the transmission 1 is relieved by the electric machine 2, in FIGS. 3B, 3C this relief is effected by means of an additional brake 25 or 26, which is assigned either to the first transmission input shaft 4 (see FIG. 3B) or the second transmission input shaft 5 (see FIG. 3C). Also dependent on this is which shift element of the transmission 1 is specifically relieved and opened, in order to provide the protection from stalling for the internal combustion engine 20. In doing so such a shift element of the transmission 1 is relieved and subsequently opened, the first shift element half of which is in torque connection with the internal combustion engine 20 and the second shift element half of which is in torque connection with the drive output 21, and whose shift element half in torque connection with the internal combustion engine 20 can be supported by the electric machine 2 or one of the brakes 25, 26.

In the case of the variants referring to FIGS. 3A, 3B and 3C for protecting the internal combustion engine 20 from staffing upon the initiation or introduction of a full brake application at the drive output 21 by the brakes 24 at the output side, the motor vehicle is in each case in IGS mode, the shift element S6 is accordingly in shift position J.

However, the above details for providing protection from stalling can also be used if the shift element S6 is in the shift position I, thus if the drive train is operated in EDA mode.

FIG. 4A shows a matrix, which presents the basic shift element positions which can be relieved and thus made load-free for each gear of the transmission 1, namely for a case 1, in which the load is relieved by the electric machine 2, and for a case H, in which the load is relieved by the brake 25 assigned to the first transmission input shaft 4, as well as for a case III, in which the load is relieved by the brake 26 assigned to the second transmission input shaft 5.

FIG. 4B shows a matrix, which specifies the shift element positions which are preferably load-free and then opened in conjunction with the stalling protection for the internal combustion engine 20.

While driving with an engaged first gear G1 in the transmission 1 with respect to the internal combustion engine 20 or while driving with an engaged sixth gear G6 in the transmission with respect to the internal combustion engine 20, if, at the drive output 21 the or any brake 24 is closed for the purpose of a full brake application, either the first shift element S1, namely the shift position A of the same, is relieved and opened by the electric machine 2 or the brake 25 assigned to the first transmission input shaft 4, or the second shift element S2, namely the shift position C of the same, is relieved and opened by a brake 26 assigned to the second transmission input shaft 5, in order to provide protection from stalling for the internal combustion engine 20. The opening of the shift element concerned position means moving the shift element concerned to neutral.

While driving with an engaged second gear in the transmission with respect to the internal combustion engine 20, namely with an engaged gear G2(1) or G2(4), or while driving with an engaged seventh gear in the transmission 1 with respect to the internal combustion engine 20, namely with an engaged gear G7(6) or G7(9), if, at the drive output 21, the or any brake 24 is closed for the purpose of a full brake application, either the fourth shift element S4, namely for the gear G2(1) and G2(4) the shift position C of the fourth shift element S4 and for the gear G7(6) and G7(9) the shift position H of the fourth shift element S4, is relieved and opened by the electric machine 2 or the brake 25 assigned to the first transmission input shaft 4, thus moved to neutral, or the second shift element S2, namely the shift position D of the same, is relieved and opened by a brake 26 assigned to the second transmission input shaft 5, thus moved to neutral.

While driving with an engaged third gear G3(4) in the transmission 1 with respect to the internal combustion engine 20 or while driving with an engaged eighth gear G8(9) in the transmission 1 with respect to the internal combustion engine 20 at the drive output 21, if the or any brake 24 is closed for the purpose of a full brake application, either the fourth shift element S4, namely the shift position G or H of the same, is relieved and opened by the electric machine 2 or the brake 25 assigned to the first transmission input shaft 4, or the third shift element S3, namely the shift position E of the same, is relieved and opened by a brake 26 assigned to the second transmission input shaft 5, in order to protect the internal combustion engine 20 from staffing.

If, while driving with an engaged fourth gear G4 or an engaged ninth gear G9 in the transmission 1 with respect to the internal combustion engine 20 at the drive output 21, the or any brake 24 is closed for the purpose of a full brake application, either the first shift element S1, namely the shift position B of the same, is relieved and opened by the electric machine 2 or the brake 25 assigned to the first transmission input shaft 4, or the second shift element S2, namely the shift position C of the same, is relieved and opened by a brake 26 assigned to the second transmission input shaft 5, in order to provide protection from stalling for the internal combustion engine 20.

If, while driving with an engaged fifth gear in the transmission 1 with respect to the internal combustion engine 20, namely with an engaged gear G5(4) or G5(9) or G5(6) at the drive output 21, the or any brake 24 is closed for the purpose of a full brake application, for the gear G5(4) either the fifth shift element S5, namely the shift position L of the same, is relieved and opened by the electric machine 2 or the brake 25 assigned to the first transmission input shaft 4, or for gears G5(4), G5(9), G5(6) the third shift element S3, namely the shift position F of the same, is relieved and opened by a brake 26 assigned to the second transmission input shaft 5. The gears G5(9), G5(6) cannot be relieved by the electric machine 2 and the brake 25.

If, while driving with an engaged tenth gear in the transmission 1 with respect to the internal combustion engine 20, namely with an engaged gear G10(9) or G10 or G10(6) or G10(0) at the drive output 21, the or any brake 24 is closed for the purpose of a full brake application, for the gears G10 and G10(6) the third shift element S3, namely the shift position F of the same, is relieved and opened either by the electric machine 2 or the brake 25 assigned to the first transmission input shaft 4 or by the brake 26 assigned to the second transmission input shaft 5. The gears G10(9), G10(0) cannot be relieved by the electric machine 2 and the brake 25 assigned to the first transmission input shaft 4, but rather only by the brake 26 assigned to the second transmission input shaft 5.

Although the drive trains shown in the figures do not comprise a starting clutch or separating clutch between the internal combustion engine 20 and transmission 1, if a full brake application is initiated, a simple and effective protection from stalling can be provided for the internal combustion engine 20 by having a shift element of the transmission 1 be relieved either by the electric machine 2 or by an additional brake 25 or 26, which is assigned to one of the two transmission input shafts 4 or 5 to decouple the internal combustion engine 20 from the drive output 21. Subsequently this relieved shift element is opened, thus moved to neutral.

The electric machine 2 and the brake 25 assigned to the first transmission input shaft 4 can also interact relieving the shift element.

The brakes 25, 26 are preferably frictionally engaged clutches. These are normally, that is, if they are not actuated, open. One clutch half of such a brake is coupled to one of the transmission input shafts, the other coupling half of these brakes is connected to the housing.

Even though it is preferable that the transmission comprises the shift element S6, which can occupy the two shift positions I and J, it is also possible that in place of the shift element S6 shown in the figures a shift element is used which connects to the electric machine 2 and the sun gear SR2 of the planetary stage PG2 upon actuation of the second transmission input shaft 5. Also, such a shift element can be completely dispensed with, wherein then the ring gear HR2 of the planetary stage PG2 is directly connected to the housing part 17. Also, in the case of these transmission modifications a stalling protection can be implemented upon the initiation of a full brake application, as described above.

REFERENCE NUMERALS

1 Drive train
2 Electric machine
3 Output shaft
4 Transmission input shaft
5 Transmission input shaft
6 Idler gear
7 Idler gear
8 Idler gear
9 Idler gear
10 Main shaft
11 Idler gear
12 Fixed gear
13 Fixed gear
14 Fixed gear
15 Fixed gear
16 Fixed gear
17 Housing
18 Stator
19 Rotor
20 Internal combustion engine
21 Drive output
22 Wheel
23 Axle drive
24 Brake
25 Brake
26 Brake
HG Main transmission
PG1 Planetary gear set
PR1 Planetary gear
SR1 Sun gear
ST1 Planetary carrier
HR1 Ring gear
PG2 Planetary gear set
PR2 Planetary gear
SR2 Sun gear
ST2 Planetary carrier
HR2 Ring gear
R1 Gear plane
R2 Gear plane
R3 Gear plane
R4 Gear plane
R5 Gear plane
S1 Shift element
S2 Shift element
S3 Shift element
S4 Shift element
S5 Shift element
S6 Shift element

The invention claimed is:

1. A transmission for a motor vehicle having a hybrid drive, a main transmission having first and second partial transmissions in parallel, an output shaft, and first and second planetary gear sets, each having three planetary elements comprising a planetary carrier, a sun gear and a ring gear, the main transmission comprising:
first and second transmission input shafts, a first gear plane, a second gear plane, a third gear plane, a fourth gear plane, and a fifth gear plane,
a first shift element, a second shift element, a third shift element, a fourth shift element and a fifth shift element,
the first planetary gear set adjoining the main transmission as a range group such that the fourth shift element, in a first shift position, connecting the fifth gear plane to a first element of the first planetary gear set, and the fifth shift element coupling a second element of the first planetary gear set, in first shift position, to the output shaft and, in a second shift position, the fifth shift element rigidly coupling the second element of the first planetary gear set to a housing,
the second planetary gear set being connected, as a planetary stage, between an electric machine and the first transmission input shaft such that the electric machine being connectable to a first element of the second planetary gear set,
an internal combustion engine being connectable to the second transmission input shaft, and
the first and the second transmission input shafts being respectively braked by first and second brakes.

2. The transmission according to claim 1, wherein the first brake is assigned to the first transmission input shaft such that a first clutch half of the first brake, configured as a frictionally engaged clutch, continuously engages with the first transmission input shaft at which the electric machine engages by the second planetary gear set, a second clutch half of the first brake is connected to the housing, and the first brake is normally disengaged.

3. The transmission according to claim 1, wherein the second brake is assigned to the second transmission input shaft such that a first clutch half of the second brake, configured as a frictionally engaged clutch, continuously engages with the second transmission input shaft with which the internal combustion engine engages, a second clutch half of the brake is connected to the housing, and the second brake is normally disengaged.

4. The transmission according to claim 1, wherein the fourth shift element, in second shift position, supplies drive from the fifth gear plane of the main transmission to a main shaft of the transmission.

5. The transmission according to claim 1, wherein one of:
the transmission comprises a sixth shift element which, in a first shift position, couples the second input shaft to the ring gear of the second planetary stage and, in a second shift position, rigidly connects the ring gear of the second planetary stage to the housing,
the ring gear of the second planetary stage is directly connected to a housing part, and
the transmission comprises the sixth shift element which, upon actuation, connects the second transmission input shaft to the electric machine and the sun gear of the second planetary stage.

6. The transmission according to claim 1, wherein the main transmission comprises at least one countershaft,
all gears on the at least one countershaft are fixed gears,
each of the first, the second, the third, the fourth and the fifth gear planes are configured as forward gear planes and a reverse gear is generated by a reversal of a direction of rotation of the electric machine,
each of the first, the second, the third and the fourth shift elements in the main transmission are unsynchronized dog shift elements, and
at least the first, the second, the third, the fourth and the fifth shift elements are double acting shift elements.

7. A method of operating a motor vehicle having a hybrid drive having an internal combustion engine, an electric machine, a transmission, a drive output and at least one brake, the transmission has a main transmission having first and second partial transmissions in parallel, first and second transmission input shafts, an output shaft, and first and second planetary gear sets, and each of the first and the second planetary gear sets having three elements comprising a planetary carrier, a sun gear and a ring gear, the main transmission having a first gear plane, a second gear plane, a third gear plane, a fourth gear plane and a fifth gear plane, the transmission having a first shift element, a second shift element, a third shift element, a fourth shift element and a fifth shift element, the first planetary gear set adjoining the main transmission as a range group such that the fourth shift element, in a first shift position, connects the fifth gear plane to a first element of the first planetary gear set, and the fifth shift element, in a first shift position, couples a second element of the first planetary gear set to the output shaft and, in a second shift position, the fifth shift element rigidly couples a second element of the first planetary gear set to a housing, the second planetary gear set is connected between the electric machine and the first transmission input shaft as a planetary stage such that the electric machine is permanently connected to a first element of the second planetary gear set, and the internal combustion engine is permanently connected to the second transmission input shaft, the method comprising:
driving the transmission with an engaged gear;
engaging a first brake at the drive output for a full brake application,
initially relieving a load on one of the first, the second, the third, the fourth and the fifth shift elements of the transmission with at least one of the electric machine and a further brake which is assigned to one of the first and the second transmission input shafts, and
subsequently disengaging the one of the first, the second, the third, the fourth and the fifth shift elements of the transmission to decouple the internal combustion engine from the drive output.

8. The method according to claim 7, further comprising designing the transmission so that the second planetary gear set is releasably connectable to the internal combustion engine and the first planetary gear set is releasably connectable to the drive output.

9. The method according to claim 7, further comprising initially relieving one of the first, the second, the third, the fourth and the fifth shift elements of the transmission of load and then subsequently disengaging a first shift element half which is in torque connection with the internal combustion engine and a second shift element half which is in torque connection with the drive output to decouple the internal combustion engine from the drive output.

10. The method according to claim 7, further comprising:
if, either while driving with an engaged gear in the transmission with respect to the internal combustion engine or while driving with an engaged sixth gear in the transmission with respect to the internal combustion engine, the first brake at the drive output is engaged, then either:

relieving the first shift element by the electric machine and then disengaging the first shift element and/or relieving the first shift element by a first further brake assigned to the first transmission input shaft and then disengaging the first shift element, or relieving the second shift element by a second further brake assigned to the second transmission input shaft and then disengaging the second shift element.

11. The method according to claim 7, further comprising:

if, either while driving with an engaged second gear in the transmission with respect to the internal combustion engine or while driving with an engaged seventh gear in the transmission with respect to the internal combustion engine, the first brake at the drive output is engaged, then either:

relieving the fourth shift element by the electric machine and then disengaging the fourth shift element and/or relieving the fourth shift element by a first further brake assigned to the first transmission input shaft and then disengaging the fourth shift element, or relieving the second shift element by a second further brake assigned to the second transmission input shaft and then disengaging the second shift element.

12. The method according to claim 7, further comprising:

if, either while driving with an engaged third gear in the transmission with respect to the internal combustion engine or while driving with an engaged eighth gear in the transmission with respect to the internal combustion engine, the first brake at the drive output is engaged, then either:

relieving the fourth shift element by the electric machine and then disengaging the fourth shift element and/or relieving the fourth shift element by a first further brake assigned to the first transmission input shaft and then disengaging the fourth shift element, or relieving the third shift element by a second further brake assigned to the second transmission input shaft and then disengaging the third shift element.

13. The method according to claim 7, further comprising:

if, either while driving with an engaged fourth gear in the transmission with respect to the internal combustion engine or while driving with an engaged ninth gear in the transmission with respect to the internal combustion engine, the first brake at the drive output is engaged, then either:

relieving the first shift element by the electric machine and then disengaging the first shift element and/or relieving the first shift element by a first further brake assigned to the first transmission input shaft and then disengaging the first shift element, or relieving the second shift element by a second further brake assigned to the second transmission input shaft and then disengaging the second shift element.

14. The method according to claim 7, further comprising:

if, while driving with an engaged fifth gear in the transmission with respect to the internal combustion engine, the first brake is engaged, then either:

relieving the fifth shift element by the electric machine and then disengaging the fifth shift element and/or relieving the fifth shift element by a first further brake assigned to the first transmission input shaft and then disengaging the fifth shift element, or relieving the third shift element by a second further brake assigned to the second transmission input shaft and then disengaging the third shift element.

15. The method according to claim 7, further comprising:

if, while driving with an engaged tenth gear in the transmission with respect to the internal combustion engine, the first brake at the drive output is engaged, then either:

relieving the third shift element by the electric machine and then disengaging the third shift element and/or relieving the third shift element by a first further brake assigned to the first transmission input shaft and then disengaging the third shift element, or relieving the third shift element by a second further brake assigned to the second transmission input shaft and then disengaging the third shift element.

* * * * *